(12) United States Patent
Xue

(10) Patent No.: US 10,103,808 B2
(45) Date of Patent: Oct. 16, 2018

(54) OPTICAL MODULE AND WAVELENGTH DETECTING METHOD

(71) Applicant: HISENSE BROADBAND MULTIMEDIA TECHNOLOGIES CO., LTD., Qingdao (CN)

(72) Inventor: Dengshan Xue, Qingdao (CN)

(73) Assignees: HISENSE BROADBAND MULTIMEDIA TECHNOLOGIES CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 101 days.

(21) Appl. No.: 15/237,869

(22) Filed: Aug. 16, 2016

(65) Prior Publication Data

US 2017/0222718 A1 Aug. 3, 2017

(30) Foreign Application Priority Data

Jan. 29, 2016 (CN) .......................... 2016 1 0069645

(51) Int. Cl.
| | |
|---|---|
| *H04B 10/08* | (2006.01) |
| *H04B 17/00* | (2015.01) |
| *H04B 10/079* | (2013.01) |
| *H04J 14/02* | (2006.01) |
| *H04B 10/25* | (2013.01) |
| *H04B 10/80* | (2013.01) |

(52) U.S. Cl.
CPC ... *H04B 10/07955* (2013.01); *H04B 10/2504* (2013.01); *H04B 10/807* (2013.01); *H04J 14/0221* (2013.01)

(58) Field of Classification Search
USPC ........................................ 398/38, 34; 385/12
See application file for complete search history.

(56) References Cited

U.S. PATENT DOCUMENTS

| | | | | | |
|---|---|---|---|---|---|
| 5,691,989 | A | * | 11/1997 | Rakuljic .................. | G02B 5/32 359/15 |
| 5,838,437 | A | * | 11/1998 | Miller ................ | G01D 5/35383 250/227.14 |
| 6,038,062 | A | * | 3/2000 | Kosaka ............ | H01S 3/094003 359/337 |

(Continued)

*Primary Examiner* — David Payne
*Assistant Examiner* — Pranesh Barua
(74) *Attorney, Agent, or Firm* — Harness, Dickey & Pierce, P.L.C.

(57) ABSTRACT

An example optical module includes: an optical splitter configured to split a received incident optical signal into a first optical signal and a second optical signal; a wavelength filter sheet configured to receive the second optical signal to reflect a first part of the second optical signal to generate reflected light, and to transmit a second part of that to generate transmitted light; a first photo detector configured to convert the reflected light into an electric signal; a second photo detector configured to convert the transmitted light into an electric signal; and an MCU configured to obtain the first detected signal and the second detected signal, to determine the difference in optical power between the reflected light and the transmitted light, and to determine from the difference in optical power and a specified standard difference in optical power whether the wavelength of the second optical signal is shifted.

17 Claims, 2 Drawing Sheets

(56) References Cited

U.S. PATENT DOCUMENTS

| | | | | |
|---|---|---|---|---|
| 6,389,188 B1* | 5/2002 | Scobey | G02B 6/29362 | 385/16 |
| 6,449,047 B1* | 9/2002 | Bao | G01D 5/35383 | 356/478 |
| 6,992,774 B2* | 1/2006 | Creasey | G01J 9/0246 | 356/450 |
| 8,275,264 B2* | 9/2012 | Watanabe | H04B 10/299 | 398/92 |
| 8,554,088 B2* | 10/2013 | Goto | H04B 10/0797 | 398/197 |
| 8,948,615 B2* | 2/2015 | Tanaka | H04B 10/672 | 398/212 |
| 9,581,741 B1* | 2/2017 | Berland | G02B 5/282 | |
| 2002/0131100 A1* | 9/2002 | Myers | H04B 10/07957 | 398/9 |
| 2003/0076568 A1* | 4/2003 | Wu | H04B 10/504 | 398/197 |
| 2004/0057041 A1* | 3/2004 | Nahum | G01J 9/00 | 356/222 |
| 2004/0070840 A1* | 4/2004 | Colin | G02B 6/29358 | 359/634 |
| 2005/0041977 A1* | 2/2005 | Denkin | H04B 10/2916 | 398/94 |
| 2007/0058897 A1* | 3/2007 | Yong | G01D 5/35303 | 385/12 |
| 2007/0098415 A1* | 5/2007 | Lupo | H01S 5/06832 | 398/197 |
| 2009/0322233 A1* | 12/2009 | Sone | G01J 1/32 | 315/158 |
| 2011/0109909 A1* | 5/2011 | Wu | G01J 3/10 | 356/445 |
| 2013/0089324 A1* | 4/2013 | Eiselt | H04B 10/40 | 398/34 |
| 2014/0270756 A1* | 9/2014 | Oda | H04B 10/0791 | 398/26 |
| 2014/0308035 A1* | 10/2014 | Ohtani | H04B 10/07955 | 398/38 |
| 2015/0155679 A1* | 6/2015 | Miyata | H01S 3/106 | 372/20 |
| 2015/0350754 A1* | 12/2015 | Zhao | H04B 10/2503 | 398/48 |
| 2016/0020853 A1* | 1/2016 | Akiyama | H04B 10/07955 | 398/38 |
| 2016/0127038 A1* | 5/2016 | Liao | H01S 5/00 | 398/38 |
| 2016/0174474 A1* | 6/2016 | Toye | A01G 13/0268 | 47/20.1 |
| 2016/0204569 A1* | 7/2016 | Kuzukami | H01S 3/0014 | 372/20 |

* cited by examiner

OPTICAL MODULE AND WAVELENGTH DETECTING METHOD

CROSS-REFERENCE TO RELATED APPLICATION

This application claims the benefit and priority of Chinese Patent Application No. 201610069645.X, filed Jan. 29, 2016. The entire disclosure of the above application is incorporated herein by reference.

FIELD

The present disclosure relates to the field of communications over optic fibers, and particularly to an optical module and a wavelength detecting method.

BACKGROUND

This section provides background information related to the present disclosure which is not necessarily prior art.

At present, an optical module of a client operates at an uplink wavelength using the technologies of Dense Wavelength Division Multiplexing (DWDM), and as the DWDM technologies are developing, a tunable laser has become prominent in an intelligent optical network due to its ability to provide an operator with a more flexible light wave at a higher speed. Since the interval between TWDM PON wavelengths in the TWDM PON standard is 100 GHz, i.e., 0.8 nm, and the required precision of the wavelengths is ±12.5 GHz, i.e., 0.1 nm, the optical module of the client may highly demand for the precision of the uplink wavelength.

SUMMARY

This section provides a general summary of the disclosure, and is not a comprehensive disclosure of its full scope or all of its features.

Some embodiments of the disclosure provide an optical module including:

an optical splitter configured to split a received incident optical signal into a first optical signal and a second optical signal, wherein the first optical signal is transmitted to a light emission port of the optical module via a first branch port of the optical splitter, and the second optical signal is transmitted to a wavelength filter sheet via a second branch port of the optical splitter;

the wavelength filter sheet arranged in an optical path of the second optical signal, and configured to receive the second optical signal, to reflect a part of the second optical signal to generate reflected light, and to transmit another part of the second optical signal to generate transmitted light;

a first photo detector arranged in an optical path of the reflected light, and configured to convert the reflected light into an electric signal, and to output a first detected signal;

a second photo detector arranged in an optical path of the transmitted light, and configured to convert the transmitted light into an electric signal, and to output a second detected signal; and a Micro Control Unit (MCU) electrically connected with the first photo detector and the second photo detector, and configured to obtain the first detected signal and the second detected signal, to determine the difference in optical power between the reflected light and the transmitted light according to the first detected signal and the second detected signal, and to determine from the difference determined in optical power and a specified standard difference in optical power whether the wavelength of the second optical signal is shifted.

Some embodiments of the disclosure provide a wavelength detecting method including:

splitting an incident optical signal into a first optical signal and a second optical signal, and transmitting the first optical signal to a light emission port of an optical module;

generating, by an optical filter medium, reflected light by reflecting a part of the second optical signal, and transmitted light by transmitting another part of the second optical signal, wherein the optical filter medium is arranged in an optical path of the second optical signal;

detecting an electric signal of the reflected light to obtain a first detected signal, and detecting an electric signal of the transmitted light to obtain a second detected signal;

determining the difference in optical power between the reflected light and the transmitted light according to the first detected signal and the second detected signal; and determining from the difference in optical power determined, and a specified standard difference in optical power whether the wavelength of the second optical signal is shifted.

Some embodiments of the disclosure provide an optical module including an optical splitter, a wavelength filter sheet, a first photo detector, a second photo detector, and an MCU, wherein:

the optical splitter is configured to split a received incident optical signal into a first optical signal and a second optical signal, and the optical splitter includes a first branch port via which the first optical signal is output, and a second branch port via which the second optical signal is output;

the wavelength filter sheet is arranged in an optical path of the second optical signal, and configured to reflect a first part of the second optical signal to generate reflected light, and to transmit a second part of the second optical signal to generate transmitted light;

the first photo detector is arranged in an optical path of the reflected light, and configured to output a first detected signal according to the reflected light;

the second photo detector is arranged in an optical path of the transmitted light, and configured to output a second detected signal according to the transmitted light; and the MCU is configured to obtain the first detected signal and the second detected signal to detect the wavelength of the second optical signal.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

In order to detect a shift of the wavelength of an optical signal for optical communication in an optical module, some embodiments of the disclosure provide an optical module and a wavelength detecting method.

Figure 1:
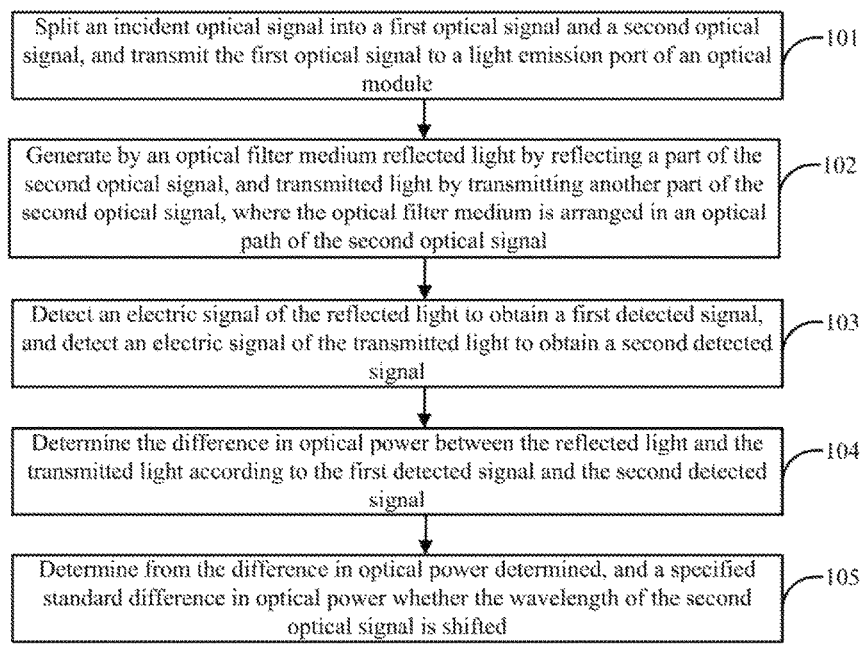
FIG. 1 is a flow chart of a wavelength detecting method according to some embodiments of the disclosure.

FIG. 1 illustrates a wavelength detecting method in the following flow:

The operation 101 is to split an incident optical signal into a first optical signal and a second optical signal, and to transmit the first optical signal to a light emission port of an optical module;

The operation 102 is to generate by an optical filter medium reflected light by reflecting a part of the second optical signal, and transmitted light by transmitting another part of the second optical signal, where the optical filter medium is arranged in an optical path of the second optical signal;

The operation 103 is to detect an electric signal of the reflected light to obtain a first detected signal, and to detect an electric signal of the transmitted light to obtain a second detected signal;

The operation 104 is to determine the difference in optical power between the reflected light and the transmitted light according to the first detected signal and the second detected signal; and The operation 105 is to determine from the difference in optical power determined, and a specified standard difference in optical power whether the wavelength of the second optical signal is shifted.

In the operation 101 above, an optical splitter, e.g., a 1-to-2 optical splitter, arranged in the optical module can split the incident optical signal into the first optical signal and the second optical signal; and configured to transmit the first optical signal from one light exit port of the 1-to-2 optical splitter to the light emission port of the optical module; and to transmit the second optical signal from another light exit port of the 1-to-2 optical splitter to the optical filter medium, where the proportion of the first optical signal to the incident optical signal ranges from 90% to 95% for communication, and the proportion of the second optical signal to the incident optical signal ranges from 5% to 10% to detect a shifted of the wavelength.

In the operation 102 above, the optical filter medium is an optical filter sheet arranged in the optical path of the second optical signal, and configured to receive the second optical signal, to reflect a part of the second optical signal received by the optical filter medium to generate the reflected light, and to reflect another part of the second optical signal to generate the transmitted light.

In the operation 103 above, the first detected signal is photo current of the reflected light, and the second detected signal is photo current of the transmitted light. The first detected signal is detected by a first photo detector arranged in an optical path of the reflected light, and configured to convert the reflected light into the electric signal, to detect photo current as a result of conversion, and to output the first detected signal. The second detected signal is detected by the a second photo detector arranged in an optical path of the transmitted light, and configured to convert the transmitted light into the electric signal, to detect photo current as a result of conversion, and to output the second detected signal.

The operation 104 above includes: determining photo voltage of the first detected signal according to the magnitude of the photo current of the reflected light; determining photo voltage of the second detected signal according to the magnitude of the photo current of the transmitted light; determining an optical power value of the reflected light according to the photo voltage and the photo current of the first detected signal; determining an optical power value of the transmitted light according to the photo voltage and the photo current of the second detected signal; and determining the difference in optical power between the optical power value of the reflected light, and the optical power value of the transmitted light. Particularly the difference in optical power is the result of the optical power value of the reflected light by subtracting the optical power value of the transmitted light. In practice, a detection circuit connected with the first photo detector determines the photo voltage of the first detected signal according to the magnitude of the photo current of the reflected light, and a detection circuit connected with the second photo detector determines the photo voltage of the second detected signal according to the magnitude of the photo current of the transmitted light; and a Micro Control Unit (MCU) electrically connected respectively with these two detection circuits determines the optical power value of the reflected light, and the optical power value of the transmitted light, and the difference between the optical power value of the reflected light, and the optical power value of the transmitted power.

A standard difference in optical power of the second optical signal, the wavelength of which is not shifted is further determined before the operation 105, and this can be determined particularly in two approaches. Preferably a wavelength value of the second optical signal, the wavelength of which is not shifted is determined according to the ratio of the photo voltage of the first detected signal, to the photo voltage of the second detected signal; and a standard difference in optical power corresponding to the wavelength value of the second optical signal, the wavelength of which is not shifted is searched for, and the found standard difference in optical power is determined as the specified difference in optical power. Optionally such a standard difference in optical power that the difference between the standard difference in optical power and the difference in optical power does not exceed a predetermined value is searched for, and such a found standard difference in optical power that the difference between the standard difference in optical power and the difference in optical power does not exceed the predetermined value is determined as the specified difference in optical power, where the predetermined value can be a value which is set as needed in reality, for example, the predetermine value can such one of all the known standard differences in optical power that is the closest to the difference in optical power, that is, the difference between the standard difference in optical power and the difference in optical power is the least.

Particularly a mapping relationship between a wavelength and a standard difference in optical power is pre-stored in the MCU, where each wavelength corresponds to one standard difference in optical power, and after the difference in optical power of the second optical signal is determined in the operation 104, the mapping relationship between a wavelength and a standard difference in optical power pre-stored in the MCU is searched for the specified standard difference in optical power.

It shall be noted that the standard difference in optical power is a difference in optical power measure in advance in the operation 101 to the operation 104 in the flow of the method above when the wavelength of the second optical signal is not shifted, i.e., the difference between the optical power of the reflected light, and the optical power of the transmitted light, both of which are generated as a result of passing the second optical signal, the wavelength of which is not reflected, through the optical filter medium.

The optical filter medium is an optical wavelength filter sheet which can be inserted and pulled out, and has such a transmittivity that varies with an optical signal at a varying wavelength so that the transmittivity of the optical signal entering the optical filter medium is proportional to the wavelength thereof, or inversely proportional to the wavelength thereof. For example, if there is an optical filter medium splitting an optical signal at a wavelength ranging from 1545.32 nm to 1533.48 nm, then the interval of wavelength between two adjacent wavelengths will be a first preset value ranging from 0.4 nm to 0.8 nm, and the interval of transmittivity between the two adjacent wavelengths will be a second preset value ranging from 3% to 6%. Due to this characteristic of the optical filter medium, the standard difference in optical power is proportional to the wavelength, or inversely proportional to the wavelength, so the real wavelength of the second optical signal to be detected may not be calculated, but it can be determined from the difference in optical power of the second optical signal, and the standard difference in optical power of the second optical signal, the wavelength of which is not shifted, whether the wavelength of the second optical signal to be detected is shifted, to thereby improve the efficiency of detection.

TABLE 1

| No. | Specific operating wavelength (nm) | Reflectivity (%) | Optical power value of first detected signal (dBm) | Transmittivity (%) | Optical power value of second detected signal (dBm) | standard difference in optical power (dBm) |
|---|---|---|---|---|---|---|
| 1 | 1545.32 | 5.00% | −13.010 | 95.00% | −0.223 | 12.79 |
| 2 | 1544.53 | 11.00% | −9.586 | 89.00% | −0.506 | 9.08 |
| 3 | 1543.73 | 17.00% | −7.696 | 83.00% | −0.809 | 6.89 |
| 4 | 1542.94 | 23.00% | −6.383 | 77.00% | −1.135 | 5.25 |
| 5 | 1542.14 | 29.00% | −5.376 | 71.00% | −1.487 | 3.89 |
| 6 | 1541.35 | 35.00% | −4.559 | 65.00% | −1.871 | 2.69 |
| 7 | 1540.56 | 41.00% | −3.872 | 59.00% | −2.291 | 1.58 |
| 8 | 1539.77 | 47.00% | −3.279 | 53.00% | −2.757 | 0.52 |
| 9 | 1538.98 | 53.00% | −2.757 | 47.00% | −3.279 | −0.52 |
| 10 | 1538.19 | 59.00% | −2.291 | 41.00% | −3.872 | −1.58 |
| 11 | 1537.4 | 65.00% | −1.871 | 35.00% | −4.559 | −2.69 |
| 12 | 1536.61 | 71.00% | −1.487 | 29.00% | −5.376 | −3.89 |
| 13 | 1535.82 | 77.00% | −1.135 | 23.00% | −6.383 | −5.25 |
| 14 | 1535.04 | 83.00% | −0.809 | 17.00% | −7.696 | −6.89 |
| 15 | 1534.26 | 89.00% | −0.506 | 11.00% | −9.586 | −9.08 |
| 16 | 1533.48 | 95.00% | −0.223 | 5.00% | −13.010 | −12.79 |

For example, Table 1 depicts a correspondence relationship between the transmittivity percentage and the reflectivity percentage of a filter medium for the optical signal at a specific operating wavelength, the optical power value of the first detected signal, the optical power value of the second detected signal, the standard difference in optical power when the wavelength of the optical signal at the specific operating wavelength is not shifted, and the wavelength. As can be apparent from the table, for the specific operating wavelength in the wavelength range between 1545.32 nm and 1533.48 nm, the interval of wavelength between two adjacent wavelengths is 0.8 nm, the interval of transmittivity between the two adjacent wavelengths is 6%, the ratio of the reflectivity to the transmittivity is 1 if it is equal to or more than 100%, the optical power value of the first detected signal is an optical power value of the reflected light generated as a result of passing an optical signal, the specific operating wavelength of which is not shifted, through the optical filter medium, the optical power value of the second detected signal is an optical power value of the transmitted light generated as a result of passing an optical signal, the specific operating wavelength of which is not shifted, through the optical filter medium, and the standard difference in optical power is the difference between the optical power value of the reflected light, and the optical power value of the transmitted light; and as can be seen from the table, the wavelength decrements by 0.8 nm, the transmittivity decrements by 6%, the reflectivity decrements by 6%, the optical power value of the first detected signal increments, the optical power value of the second detected signal decrements, and the difference in optical power decrements.

Thus it can be determined whether the wavelength to be detected is shifted, and also whether the wavelength is shifted particularly toward the red or blue color, by comparing the measured difference in optical power between the reflected light and the transmitted light, at the wavelength to be detected, after passing the optical filter medium, with the standard difference in optical power corresponding to each specific operating wavelength in Table 1.

Further to the example above, in the operation 105, if the wavelength of the second optical signal is larger, then the transmittivity thereof in the optical filter medium will be higher, and the difference in optical power determined will be larger, so the operation 105 can include: if the difference in optical power determined is more than the specified standard difference in optical power, then determining that the second optical signal is shifted toward the red color; and if the difference in optical power determined is less than the specified standard difference in optical power, then determining that the second optical signal is shifted toward the blue color.

In some embodiments of the disclosure, if the wavelength of the second optical signal is larger, then the transmittivity thereof in the optical filter medium will be lower, and the difference in optical power determined will be smaller, so the operation 105 can include: if the difference in optical power determined is more than the specified standard difference in optical power, then determining that the second optical signal is shifted toward the blue color; and if the difference in optical power determined is less than the specified standard difference in optical power, then determining that the second optical signal is shifted toward the red color.

After the operation 105, the method further includes: if it is determined that the second optical signal is shifted toward the blue color, then transmitting a temperature rise control instruction to a Thermal-Electric Cooler (TEC) control circuit of the optical module; and if it is determined that the second optical signal is shifted toward the red color, then transmitting a temperature drop control instruction to the TEC control circuit, so that the TEC control circuit adjusts temperature of a laser in the optical module in response to the received instruction, and locks the incident optical signal emitted by the laser to the wavelength of the second optical signal which is not shifted.

In the flow of the method above, the incident optical signal is split into the first optical signal and the second optical signal, the first optical signal is transmitted to the light emission port of the optical module for optical communication, and the second optical signal is configured to detect the wavelength of the optical signal; the optical filter medium arranged in the optical path of the second optical signal reflects a part of the second optical signal to generate the reflected light, and another part of the second optical signal to generate the transmitted light; the electric signal of the reflected light is detected to obtain the first detected signal, and the electric signal of the transmitted light is detected to obtain the second detected signal; the difference in optical power between the reflected light and the transmitted light is determined according to the first detected signal and the second detected signal; and it is determined from the difference in optical power determined and the standard difference in optical power whether the wavelength of the second optical signal is shifted. It can be determined from the difference in optical power between the reflected light and the transmitted light of the second optical signal to be detected, whether the wavelength of the second optical signal is shifted, to thereby detect a shift of the wavelength of the optical signal for optical communication in the optical module. As compared with the prior art, the direction in which the wavelength of the second optical signal is shifted can be determined without calculating the real wavelength of the second optical signal, to thereby improve the efficiency of detecting the wavelength by the optical module and simplify the operation of locking the wavelength.

Some embodiments of the disclosure provide an optical module which can detect a shift of the wavelength of an optical signal being transmitted, correct the wavelength which is shifted, and lock the wavelength of the optical signal being transmitted, to a specific operating wavelength.

Figure 2:
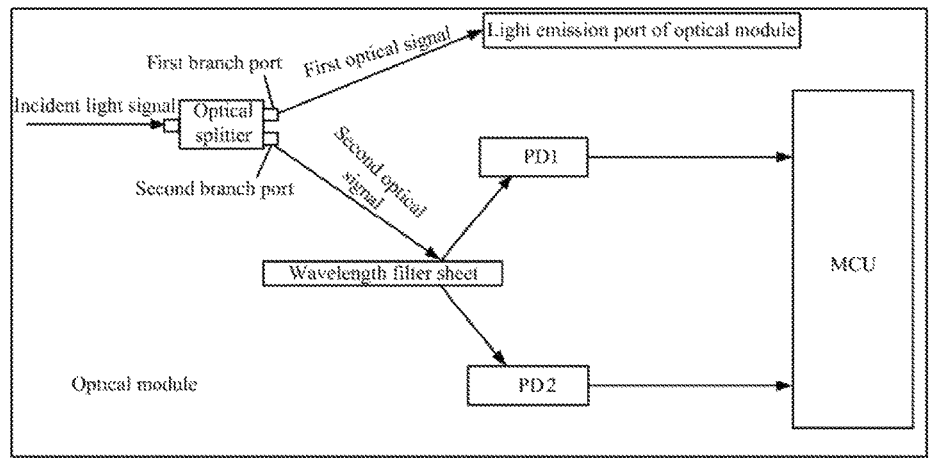
FIG. 2 is a schematic structural diagram of an optical module according to some embodiments of the disclosure.

As illustrated in FIG. 2, some embodiments of the disclosure provide an optical module including;

A splitter is configured to split a received incident optical signal into a first optical signal and a second optical signal, to transmit the first optical signal to a light emission port of the optical module via a first branch port of the splitter, and to transmit the second optical signal to a wavelength filter sheet via a second branch port of the splitter;

The wavelength filter sheet is arranged in an optical path of the second optical signal, and configured to receive the second optical signal, to reflect a part of the second optical signal to generate reflected light, and to transmit another part of the second optical signal to generate transmitted light;

A first photo detector PD1 is arranged in an optical path of the reflected light, and configured to convert the reflected signal into an electric signal, and to output a first detected signal;

A second photo detector PD2 is arranged in an optical path of the transmitted light, and configured to convert the transmitted signal into an electric signal, and to output a second detected signal; and A Micro Control Unit (MCU) is electrically connected respectively with the first photo detector PD1 and the second photo detector PD2, and configured to obtain the first detected signal and the second detected signal, to determine the difference in optical power between the reflected light and the transmitted light according to the first detected signal and the second detected signal; and to determine from the difference in optical power determined and a specified standard difference in optical power whether the wavelength of the second optical signal is shifted.

The optical splitter above is a 1-to-2 optical splitter as illustrated in FIG. 2 configured to split the received incident optical signal into the first optical signal and the second optical signal, to transmit the first optical signal from one light exit port of the 1-to-2 optical splitter to the light emission port of the optical module, and to transmit the second optical signal from the other light exit port of the 1-to-2 optical splitter to the optical filter medium, where the proportion of the first optical signal as a result of splitting to the incident optical signal ranges from 90% to 95% for communication, and the proportion of the second optical signal as a result of splitting to the incident optical signal ranges from 5% to 10% to detect a shift of the wavelength.

The wavelength filter sheet can be a well-packaged optical wavelength filter sheet which can be inserted and pulled out, In some embodiments, the wavelength filter sheet includes two light exit ports, one of which is located in the optical path of the reflected light, where the first photo detector is arranged at the light exit port, and the other of which is located in the optical path of the transmitted light, where the second photo detector is arranged at the light exit port.

The first detected signal is photo current of the reflected light, and the second detected signal is photo current of the transmitted light; and the MCU determines the difference in optical power between the reflected light and the transmitted light according to the first detected signal and the second detected signal, particularly by determining photo voltage of the first detected signal according to the magnitude of the photo current of the reflected light; determining photo voltage of the second detected signal according to the magnitude of the photo current of the transmitted light; determining an optical power value of the reflected light according to the photo voltage and the photo current of the first detected signal; determining an optical power value of the transmitted light according to the photo voltage and the photo current of the second detected signal; and determining the difference in optical power according to the optical power value of the reflected light, and the optical power value of the transmitted light. The difference in optical power is the result of the optical power value of the reflected light by subtracting the optical power value of the transmitted light.

In some embodiments, in order to ensure the accuracy of detecting the wavelength, there is the same specification, i.e., the same photo-electric conversion efficiency, the first photo detector PD1 and the second photo detector PD2.

Figure 3:
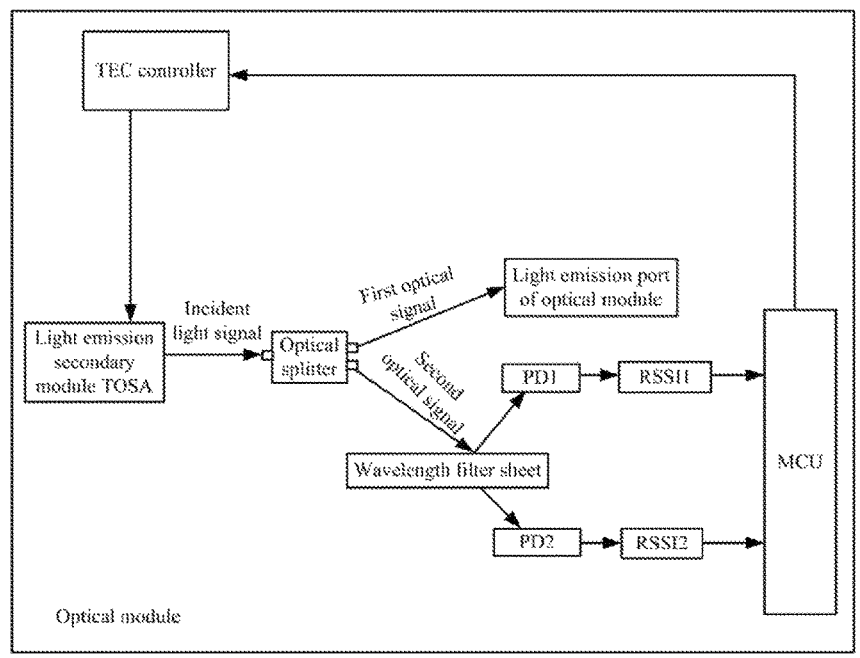
FIG. 3 is a schematic structural diagram of an optical module according to some embodiments of the disclosure.

In some embodiments, the optical module further includes a first detection circuit RSSI1 and a second detection circuit RSSI2 as illustrated in FIG. 3, where the first detection circuit RSSI1 is arranged between the first photo detector PD1 and the MCU, and configured to determine the photo voltage of the first detected signal according to the magnitude of the photo current of the reflected light, and to report the photo voltage of the first detected signal to the MCU; and the second detection circuit RSSI2 is arranged between the second photo detector PD2 and the MCU, and configured to determine the photo voltage of the second detected signal according to the magnitude of the photo current of the transmitted light, and to report the photo voltage of the second detected signal to the MCU. At this time the MCU is configured to determine the optical power value of the reflected light according to the photo voltage and the photo current of the first detected signal, to determine the optical power value of the transmitted light according to the photo voltage and the photo current of the second detected signal, and to determine the difference in optical power according to the optical power value of the reflected light, and the optical power value of the transmitted light.

The MCU is further configured to search for a standard difference in optical power of the second optical signal, the wavelength of which is not shifted, after determining the difference in optical power of the second optical signal, for the purpose of determining whether the wavelength of the second optical signal is shifted, where the standard difference in optical power is the difference between the optical power of the reflected light, and the optical power of the transmitted light after the second optical signal, the wavelength of which is not shifted, is split by the wavelength filter sheet. Entries of a mapping relationship between a wavelength and a standard difference in optical power are pre-stored in the MCU, where each wavelength corresponds to one standard difference in optical power. The standard difference in optical power of the second optical signal, the wavelength of which is not shifted is searched for by searching the entries of the mapping relationship between a wavelength and a standard difference in optical power in the MCU for the specified standard difference in optical power.

The standard difference in optical power of the second optical signal, the wavelength of which is not shifted can be searched for particularly in two approaches. Preferably a wavelength value of the second optical signal, the wavelength of which is not shifted is determined according to the ratio of the photo voltage of the first detected signal, to the photo voltage of the second detected signal; and a standard difference in optical power corresponding to the wavelength value of the second optical signal, the wavelength of which is not shifted is searched for, and the found standard difference in optical power is determined as the specified difference in optical power. Optionally such a standard difference in optical power that the difference between the standard difference in optical power and the difference in optical power does not exceed a predetermined value is searched for, and such a found standard difference in optical power that the difference between the standard difference in optical power and the difference in optical power does not exceed the predetermined value is determined as the specified difference in optical power, where the predetermined value can be a value which is set as needed in reality, for example, the predetermine value can such one of all the known standard differences in optical power that is the closest to the difference in optical power, that is, the difference between the standard difference in optical power and the difference in optical power is the least.

It shall be noted that the standard difference in optical power in the entries is the difference in optical power between the optical power of the reflected light, and the optical power of the transmitted light generated as a result of passing the second optical signal, the wavelength of which is not shifted, through the optical filter sheet, as depicted in Table 1.

The wavelength filter sheet is an optical filter sheet characterized in that it has such a transmittivity that varies with an optical signal at a varying wavelength so that the transmittivity of the optical signal received by the optical filter sheet is proportional to the wavelength thereof, or inversely proportional to the wavelength thereof. For example, if there is an optical filter medium splitting an optical signal at a wavelength ranging from 1545.32 nm to 1533.48 nm, then the interval of wavelength between two adjacent wavelengths will be a first preset value ranging from 0.4 nm to 0.8 nm, and the interval of transmittivity between the two adjacent wavelengths will be a second preset value ranging from 3% to 6%. Due to this characteristic of the wavelength filter sheet, the standard difference in optical power is proportional to the wavelength, or inversely proportional to the wavelength, so the real wavelength of the second optical signal to be detected may not be calculated, but it can be determined from the difference in optical power of the second optical signal, and the standard difference in optical power of the second optical signal, the wavelength of which is not shifted, whether the wavelength of the second optical signal to be detected is shifted, to thereby improve the efficiency of detection.

The MCU can determine whether the wavelength of the second optical signal to be detected is shifted, after determining the difference in optical power of the second optical signal to be detected, and the standard difference in optical power of the second optical signal, the wavelength of which is not shifted. Two application examples will be listed below.

In a first application scenario, if the wavelength of the second optical signal to be detected is larger, then the transmittivity thereof in the wavelength filter sheet will be higher, and the difference in optical power determined by the MCU will be larger, so the MCU determines whether the wavelength of the second optical signal to be detected is shifted by: if the difference in optical power determined is more than the specified standard difference in optical power, then determining that the second optical signal is shifted toward the red color; and if the difference in optical power determined is less than the specified standard difference in optical power, then determining that the second optical signal is shifted toward the blue color. For example, the specific operating wavelength in Table 1 is 1545.32 nm, and for light at this wavelength, the specified standard difference in optical power between the PD2 and the PD1 shall be 12.79 dBm, and if the detected difference in optical power of the second optical signal becomes smaller, e.g., is 12.71 dBm, then the specified standard difference in optical power at the specific operating wavelength of 1544.53 nm will be 9.08 dBm, which indicates that the specific operating wavelength of 1544.32 nm has been shifted toward the other operating wavelength of 1544.53 nm.

In a second application scenario, if the wavelength of the second optical signal to be detected is larger, then the transmittivity thereof in the wavelength filter sheet will be lower, and the difference in optical power determined by the MCU will be smaller, so the MCU determines whether the wavelength of the second optical signal to be detected is shifted by: if the difference in optical power determined is more than the specified standard difference in optical power, then determining that the second optical signal is shifted toward the blue color; and if the determined difference in optical power is less than the specified standard difference in optical power, then determining that the second optical signal is shifted toward the red color.

If the MCU determines that the second optical signal to be detected is shifted toward the blue color, then the MCH will be further configured: to transmit a temperature rise control instruction to a Thermal-Electric Cooler (TEC) control circuit of the optical module; and if it is determined that the second optical signal is shifted toward the red color, to transmit a temperature drop control instruction to the TEC control circuit, so that the TEC control circuit adjusts temperature of a laser in the optical module in response to the received instruction, and locks the incident optical signal emitted by the laser to the wavelength of the second optical signal which is not shifted.

As illustrated in FIG. 3, the optical module further includes a TEC control circuit electrically connected with the MCU, and a light emission secondary module TOSA connected with the TEC control circuit, where the TEC control circuit is configured to correct the wavelength of an optical signal emitted by the light emission secondary module TOSA, and the light emitted by the light emission secondary module TOSA is received by the optical splitter.

In FIG. 3, an optical signal entering a light entrance port of the optical splitter is an incident optical signal. The light emission secondary module TOSA is illustrated in FIG. 3 merely for the purpose of exemplifying the relative position of the a TEC control circuit to the light emission secondary module TOSA instead of limiting the structure of the light emission secondary module TOSA, and the real position thereof in the optical module.

It shall be noted that the embodiment of the disclosure will not be limited to any particular position of the optical splitter in the optical module.

The light emission secondary module TOSA includes at least a laser and a lens component, and a light emission port via which the optical signal is output, i.e., the light emission port of the optical module in the embodiment above. In some embodiments, the optical signal emitted by the laser passes through the lens component, and then is transmitted to a light exit port of the lens component, and the optical splitter is arranged at the light exit port of the lens component, and configured to receive the optical signal output via the light exit port of the lens component. In another optional embodiment, the optical splitter can be arranged at the light emission port of the light emission secondary module TOSA, and configured to receive the optical signal output via the light emission port of the light emission secondary module TOSA.

The TEC control circuit corrects the wavelength of the optical signal output by the light emission secondary module TOSA as follows: the TEC control circuit adjusts a temperature adjustor of the laser in response to the received instruction to raise or drop temperature so as to adjust temperature of the laser in the optical module, and to lock the incident optical signal emitted by the laser to the wavelength of the second optical signal which is not shifted, where generally if the temperature of the laser is higher, then the wavelength of the emitted optical signal will be larger.

The corrected incident optical signal emitted by the laser of the light emission secondary module TOSA is received by the optical splitter, and further the incident optical signal received is detected and corrected as in the embodiment above illustrated in FIG. 3, and it is determined whether the wavelength of the optical signal corrected is locked to the specific operating wavelength, and if no, then the wavelength of the incident optical signal will be further detected and corrected until the wavelength of the incident optical signal is locked to the specific operating wavelength.

The optical splitter, the wavelength filter sheet, the MCU, etc., are arranged in the optical module so that the optical signal emitted by the optical module is locked to the specific operating wavelength, where the optical splitter arranged in the optical module splits the received incident optical signal into the first optical signal and the second optical signal, the first optical signal is transmitted via the first branch port of the optical splitter to the light emission port of the optical module for optical communication, and the second optical signal is transmitted to the wavelength filter sheet via the second branch port of the optical splitter to detect the wavelength of the optical signal; the optical splitter arranged in the optical path of the second optical signal receives the second optical signal, reflects a part of the second optical signal to generate the reflected light, and another part of the second optical signal to generate the transmitted light; the first photo detector arranged in the optical path of the reflected light obtains the first detected signal of the reflected light; the second photo detector arranged in the optical path of the transmitted light obtains the second detected signal of the transmitted light; and the MCU determines in real time the difference in optical power between the reflected light and the transmitted light according to the first detected signal and second detected signal obtained, and determines from the difference in optical power determined and the standard difference in optical power whether the wavelength of the second optical signal is shifted, so that a shift of the wavelength of the optical signal for optical communication in the optical module can be detected. It can be determined from the difference in optical power between the reflected light and the transmitted light of the second optical signal to be detected, whether the wavelength of the second optical signal is shifted. As compared with the prior art, the direction in which the wavelength of the second optical signal is shifted can be determined without calculating the real wavelength of the second optical signal, to thereby improve the efficiency of detecting the wavelength, and simplify the operation of locking the wavelength.

Some embodiments of the disclosure further provide an optical module including an optical splitter, a wavelength filter sheet, a first photo detector, a second photo detector, and an MCU, where the optical splitter is configured to split a received incident optical signal into a first optical signal and a second optical signal, and the optical splitter includes a first branch port via which the first optical signal is output, and a second branch port via which the second optical signal is output;

The wavelength filter sheet is arranged in an optical path of the second optical signal, and configured to reflect a first part of the second optical signal to generate reflected light, and to transmit a second part of the second optical signal to generate transmitted light;

The first photo detector is arranged in an optical path of the reflected light, and configured to output a first detected signal according to the reflected light;

The second photo detector is arranged in an optical path of the transmitted light, and configured to output a second detected signal according to the transmitted light; and The MCU is configured to obtain the first detected signal and the second detected signal to detect the wavelength of the second optical signal.

The optical module includes a light emission port via which the first optical signal is emitted for communication;

The second optical signal is output to the wavelength optical filter sheet, and configured to detect the wavelength of the second optical signal.

The proportion of the first optical signal to the incident optical signal is no less than 70%.

The MCU is configured to determine the difference in optical power between the reflected light and the transmitted light according to the first detected signal and the second detected signal; and To determine from the difference in optical power determined and a specified standard difference in optical power whether the wavelength of the second optical signal is shifted.

Where the first detected signal is photo current of the reflected light, and the second detected signal is photo current of the transmitted light. In some embodiments, the optical module further includes:

A first detection circuit is arranged between the first photo detector and the MCU, and configured to determine photo voltage of the first detected signal according to the magnitude of the photo current of the reflected light, and to report the photo voltage of the first detected signal to the MCU; and A second detection circuit is arranged between the second photo detector and the MCU, and configured to determine photo voltage of the second detected signal according to the magnitude of the photo current of the transmitted light, and to report the photo voltage of the second detected signal to the MCU; and The MCU is configured to determine an optical power value of the reflected light according to the photo voltage and the photo current of the first detected signal, to determine an optical power value of the transmitted light according to the photo voltage and the photo current of the second detected signal, and to determine the difference in optical power according to the optical power value of the reflected light, and the optical power value of the transmitted light.

The standard difference in optical power is the difference between optical power value of the reflected light, and the optical power value of the transmitted power after the second optical signal, the wavelength of which is not shifted, is split by the wavelength filter sheet; and The MCU is further configured:

To search for such a standard difference in optical power that the difference between the standard difference in optical power and the difference in optical power does not exceed a predetermined value, and to determine such a found standard difference in optical power that the difference between the standard difference in optical power and the difference in optical power does not exceed the predetermined value as the specified difference in optical power; or To determine a wavelength value of the second optical signal, the wavelength of which is not shifted is determined according to the ratio of the photo voltage of the first detected signal, to the photo voltage of the second detected signal; and to search for a standard difference in optical power corresponding to the wavelength value determined, the wavelength of which is not shifted, and to determine the found standard difference in optical power as the specified difference in optical power.

If the wavelength of the second optical signal is larger, then the transmittivity thereof in the wavelength filter sheet will be higher, and the difference in optical power determined by the MCU will be larger, and The MCU is configured:

If the difference in optical power determined is more than the specified standard difference in optical power, to determine that the second optical signal is shifted toward the red color; and If the difference in optical power determined is less than the specified standard difference in optical power, to determine that the second optical signal is shifted toward the blue color; or If the wavelength of the second optical signal is larger, then the transmittivity thereof in the wavelength filter sheet will be lower, and the difference in optical power determined by the MCU will be smaller, and The MCU is configured:

If the difference in optical power determined is more than the specified standard difference in optical power, to determine that the second optical signal is shifted toward the blue color, and If the difference in optical power determined is less than the specified standard difference in optical power, to determine that the second optical signal is shifted toward the red color.

The MCU is further configured: if it is determined that the second optical signal is shifted toward the blue color, to transmit a temperature rise control instruction to a Thermal-Electric Cooler (TEC) control circuit of the optical module; and if it is determined that the second optical signal is shifted toward the red color, to transmit a temperature drop control instruction to the TEC control circuit, so that the TEC control circuit adjusts temperature of a laser in the optical module in response to the received instruction, and locks the incident optical signal emitted by the laser to the wavelength of the second optical signal which is not shifted.

If the wavelength optical filter sheet splits an optical signal at a wavelength ranging from 1545.32 nm to 1533.48 nm, then the interval of wavelength between two adjacent wavelengths will be a first preset value ranging from 0.4 nm to 0.8 nm, and the interval of transmittivity between the two adjacent wavelengths will be a second preset value ranging from 3% to 6%.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An optical module comprising:
a light emission port;
an optical splitter configured to split a received incident optical signal into a first optical signal and a second optical signal, the optical splitter including a first branch port to transmit the first optical signal to the light emission port and a second branch port to transmit the second optical signal to a wavelength filter sheet, the wavelength filter sheet arranged in an optical path of the second optical signal and configured to receive the second optical signal, to reflect a part of the second optical signal to generate reflected light, and to transmit another part of the second optical signal to generate transmitted light;
a first photo detector arranged in an optical path of the reflected light and configured to convert the reflected light into an electric signal and to output a first detected signal;
a second photo detector arranged in an optical path of the transmitted light and configured to convert the transmitted light into an electric signal and to output a second detected signal; and
a Micro Control Unit (MCU) electrically connected with the first photo detector and the second photo detector and configured to obtain the first detected signal and the second detected signal, to determine a difference in optical power between the reflected light and the transmitted light according to the first detected signal and the second detected signal, and to determine whether a wavelength of the second optical signal is shifted according to the determined difference in optical power and a specified standard difference in optical power;

wherein when the wavelength filter sheet splits an optical signal at a wavelength ranging from 1545.32 nm to 1533.48 nm, an interval of wavelength between two adjacent wavelengths is a first preset value ranging from 0.4 nm to 0.8 nm, and an interval of transmittivity between the two adjacent wavelengths is a second preset value ranging from 3% to 6%.

2. The optical module according to claim 1, wherein the first detected signal is a photo current of the reflected light, the second detected signal is a photo current of the transmitted light, and the optical module further comprises:
a first detection circuit arranged between the first photo detector and the MCU, and configured to determine a photo voltage of the first detected signal according to a magnitude of the photo current of the reflected light, and to report the photo voltage of the first detected signal to the MCU; and
a second detection circuit arranged between the second photo detector and the MCU, and configured to determine a photo voltage of the second detected signal according to a magnitude of the photo current of the transmitted light, and to report the photo voltage of the second detected signal to the MCU;
wherein the MCU is configured to determine an optical power value of the reflected light according to the photo voltage and the photo current of the first detected signal, to determine an optical power value of the transmitted light according to the photo voltage and the photo current of the second detected signal, and to determine the difference in optical power according to the optical power value of the reflected light and the optical power value of the transmitted light.

3. The optical module according to claim 2, wherein the specified standard difference in optical power is the difference between the optical power value of the reflected light and the optical power value of the transmitted power after the second optical signal is split by the wavelength filter sheet without shifting the wavelength of the second optical signal; and
the MCU is further configured:
to search for a standard difference in optical power where a difference between the standard difference in optical power and the determined difference in optical power does not exceed a predetermined value, and to determine a found standard difference in optical power as the specified difference in optical power; or
to determine a wavelength value of the second optical signal without shifting the wavelength of the second optical signal, according to a ratio of the photo voltage of the first detected signal to the photo voltage of the second detected signal, to search for a standard difference in optical power corresponding to the determined wavelength value without shifting the wavelength of the second optical signal, and to determine a found standard difference in optical power as the specified difference in optical power.

4. The optical module according to claim 3, wherein:
a transmittivity of the wavelength filter sheet and the difference in optical power determined by the MCU have a positive correlation with the wavelength of the second optical signal, and the MCU is configured, when the determined difference in optical power is more than the specified standard difference in optical power, to determine that the second optical signal is shifted toward a red color, and when the determined difference in optical power is less than the specified standard difference in optical power, to determine that the second optical signal is shifted toward a blue color; or
the transmittivity of the wavelength filter sheet and the difference in optical power determined by the MCU has a reverse correlation with the wavelength of the second optical signal, and the MCU is configured, when the determined difference in optical power is more than the specified standard difference in optical power, to determine that the second optical signal is shifted toward the blue color, and when the determined difference in optical power is less than the specified standard difference in optical power, to determine that the second optical signal is shifted toward the red color.

5. The optical module according to claim 4, wherein the MCU is further configured:
when it is determined that the second optical signal is shifted toward the blue color, to transmit a temperature rise control instruction to a Thermal-Electric Cooler (TEC) control circuit of the optical module; and
when it is determined that the second optical signal is shifted toward the red color, to transmit a temperature drop control instruction to the TEC control circuit to adjust a temperature of a laser in the optical module in response to the received instruction, and to lock an incident optical signal emitted by the laser to the wavelength of the second optical signal without shifting the wavelength of the second optical signal.

6. A wavelength detecting method comprising:
splitting an incident optical signal into a first optical signal and a second optical signal, and transmitting the first optical signal to a light emission port of an optical module;
generating, by an optical filter medium, reflected light by reflecting a part of the second optical signal and generating transmitted light by transmitting another part of the second optical signal, wherein the optical filter medium is arranged in an optical path of the second optical signal;
detecting an electric signal of the reflected light to obtain a first detected signal, and detecting an electric signal of the transmitted light to obtain a second detected signal;
determining a difference in optical power between the reflected light and the transmitted light according to the first detected signal and the second detected signal; and
determining whether a wavelength of the second optical signal is shifted according to the determined difference in optical power and a specified standard difference in optical power;
wherein when the optical filter medium splits an optical signal at a wavelength ranging from 1545.32 nm to 1533.48 nm, an interval of wavelength between two adjacent wavelengths is a first preset value ranging from 0.4 nm to 0.8 nm, and an interval of transmittivity between the two adjacent wavelengths is a second preset value ranging from 3% to 6%.

7. The method according to claim 6, wherein:
the first detected signal is a photo current of the reflected light, and the second detected signal is a photo current of the transmitted light; and
determining the difference in optical power between the reflected light and the transmitted light according to the first detected signal and the second detected signal comprises:

determining a photo voltage of the first detected signal according to a magnitude of the photo current of the reflected light;
determining a photo voltage of the second detected signal according to a magnitude of the photo current of the transmitted light;
determining an optical power value of the reflected light according to the photo voltage and the photo current of the first detected signal;
determining an optical power value of the transmitted light according to the photo voltage and the photo current of the second detected signal; and
determining a difference in optical power between the optical power value of the reflected light and the optical power value of the transmitted light.

8. The method according to claim 7, wherein the specified standard difference in optical power is the difference between optical power value of the reflected light and the optical power value of the transmitted power, both of which are generated as a result of passing the second optical signal through the optical filter medium without shifting the wavelength of the second optical signal; and
after the photo voltages of the first detected signal and the second detected signal are determined, the method further comprises:
searching for a standard difference in optical power where a difference between the standard difference in optical power and the determined difference in optical power does not exceed a predetermined value, and determining a found standard difference in optical power as the specified difference in optical power; or
determining a wavelength value of the second optical signal without shifting the wavelength of the second optical signal, according to a ratio of the photo voltage of the first detected signal to the photo voltage of the second detected signal, searching for a standard difference in optical power corresponding to the determined wavelength value without shifting the wavelength of the second optical signal, and to determine a found standard difference in optical power as the specified difference in optical power.

9. The method according to claim 8, wherein:
a transmittivity of the optical filter medium and the determined difference in optical power have a positive correlation with the wavelength of the second optical signal, and determining whether the wavelength of the second optical signal is shifted according to the determined difference in optical power and the specified standard difference in optical power comprises, when the determined difference in optical power is more than the specified standard difference in optical power, determining that the second optical signal is shifted toward a red color, and when the determined difference in optical power is less than the specified standard difference in optical power, determining that the second optical signal is shifted toward a blue color; or
the transmittivity of the optical filter medium and the determined difference in optical power has a positive correlation with the wavelength of the second optical signal, and determining whether the wavelength of the second optical signal is shifted according to the determined difference in optical power and the specified standard difference in optical power comprises, when the determined difference in optical power is more than the specified standard difference in optical power, determining that the second optical signal is shifted toward the blue color, and when the determined difference in optical power is less than the specified standard difference in optical power, determining that the second optical signal is shifted toward the red color.

10. An optical module comprising:
an optical splitter configured to split a received incident optical signal into a first optical signal and a second optical signal, the optical splitter including a first branch port to output the first optical signal and a second branch port to output the second optical signal;
a wavelength filter sheet arranged in an optical path of the second optical signal and configured to reflect a first part of the second optical signal to generate reflected light, and to transmit a second part of the second optical signal to generate transmitted light;
a first photo detector arranged in an optical path of the reflected light and configured to output a first detected signal according to the reflected light;
a second photo detector arranged in an optical path of the transmitted light and configured to output a second detected signal according to the transmitted light; and
an MCU configured to obtain the first detected signal and the second detected signal to detect a wavelength of the second optical signal;
wherein when the wavelength filter sheet splits an optical signal at a wavelength ranging from 1545.32 nm to 1533.48 nm, an interval of wavelength between two adjacent wavelengths is a first preset value ranging from 0.4 nm to 0.8 nm, and an interval of transmittivity between the two adjacent wavelengths is a second preset value ranging from 3% to 6%.

11. The optical module according to claim 10, further comprising a light emission port configured to transmit the first optical signal for communication;
wherein the second optical signal is output to the wavelength filter sheet, and the MCU is configured to detect the wavelength of the second optical signal.

12. The optical module according to claim 10, wherein a proportion of the first optical signal to the incident optical signal is no less than 70%.

13. The optical module according to claim 10, wherein the MCU is configured:
to determine a difference in optical power between the reflected light and the transmitted light according to the first detected signal and the second detected signal; and
to determine whether a wavelength of the second optical signal is shifted according to from the determined difference in optical power and a specified standard difference in optical power.

14. The optical module according to claim 10, wherein the first detected signal is a photo current of the reflected light, the second detected signal is a photo current of the transmitted light, and the optical module further comprises:
a first detection circuit arranged between the first photo detector and the MCU, and configured to determine a photo voltage of the first detected signal according to a magnitude of the photo current of the reflected light, and to report the photo voltage of the first detected signal to the MCU; and
a second detection circuit arranged between the second photo detector and the MCU, and configured to determine a photo voltage of the second detected signal according to a magnitude of the photo current of the transmitted light, and to report the photo voltage of the second detected signal to the MCU;
wherein the MCU is configured to determine an optical power value of the reflected light according to the photo voltage and the photo current of the first detected signal, to determine an optical power value of the transmitted light according to the photo voltage and the photo current of the second detected signal, and to determine the difference in optical power according to the optical power value of the reflected light and the optical power value of the transmitted light.

15. The optical module according to claim 14, wherein the specified standard difference in optical power is the difference between the optical power value of the reflected light and the optical power value of the transmitted power after the second optical signal is split by the wavelength filter sheet without shifting the wavelength of the second optical signal; and the MCU is further configured:

to search for a standard difference in optical power where a difference between the standard difference in optical power and the determined difference in optical power does not exceed a predetermined value, and to determine a found standard difference in optical power as the specified difference in optical power; or to determine a wavelength value of the second optical signal without shifting the wavelength of the second optical signal, according to a ratio of the photo voltage of the first detected signal to the photo voltage of the second detected signal, to search for a standard difference in optical power corresponding to the determined wavelength value without shifting the wavelength of the second optical signal, and to determine a found standard difference in optical power as the specified difference in optical power.

16. The optical module according to claim 15:

a transmittivity of the wavelength filter sheet and the difference in optical power determined by the MCU have a positive correlation with the wavelength of the second optical signal, and the MCU is configured, when the determined difference in optical power is more than the specified standard difference in optical power, to determine that the second optical signal is shifted toward a red color, and when the determined difference in optical power is less than the specified standard difference in optical power, to determine that the second optical signal is shifted toward a blue color; or the transmittivity of the wavelength filter sheet and the difference in optical power determined by the MCU has a reverse correlation with the wavelength of the second optical signal, and the MCU is configured, when the determined difference in optical power is more than the specified standard difference in optical power, to determine that the second optical signal is shifted toward the blue color, and when the determined difference in optical power is less than the specified standard difference in optical power, to determine that the second optical signal is shifted toward the red color.

17. The optical module according to claim 16, wherein the MCU is further configured:

when it is determined that the second optical signal is shifted toward the blue color, to transmit a temperature rise control instruction to a Thermal-Electric Cooler (TEC) control circuit of the optical module; and when it is determined that the second optical signal is shifted toward the red color, to transmit a temperature drop control instruction to the TEC control circuit to adjust a temperature of a laser in the optical module in response to the received instruction, and to lock an incident optical signal emitted by the laser to the wavelength of the second optical signal without shifting the wavelength of the second optical signal.

* * * * *